United States Patent [19]

Umemura

[11] Patent Number: 4,805,145
[45] Date of Patent: Feb. 14, 1989

[54] METHOD FOR RECORDING AND REPRODUCING INFORMATION

[75] Inventor: Shizuo Umemura, Ibaragi, Japan

[73] Assignee: Research Development Corporation of Japan, Tokyo, Japan

[21] Appl. No.: 939,311

[22] Filed: Dec. 8, 1986

[30] Foreign Application Priority Data

Dec. 13, 1985 [JP] Japan .................... 60-278889

[51] Int. Cl.$^4$ ............................................. G11C 13/00
[52] U.S. Cl. .................................... 365/118; 365/237
[58] Field of Search ............... 365/114, 118, 128, 237; 346/135.1; 430/942; 427/307, 305

[56] References Cited

U.S. PATENT DOCUMENTS

| | | | |
|---|---|---|---|
| 4,085,455 | 4/1978 | Okumura | 365/118 X |
| 4,269,934 | 5/1981 | Borrelli et al. | 365/118 X |
| 4,672,578 | 6/1987 | Munakata et al. | 365/118 |
| 4,700,198 | 10/1987 | Shirahata | 346/1.1 |
| 4,713,258 | 12/1987 | Umemura | 427/35 |

Primary Examiner—Joseph A. Popek
Attorney, Agent, or Firm—Armstrong, Nikaido, Marmelstein & Kobovcik

[57] ABSTRACT

A method for recording and reproducing information includes the steps of regularly arranging fine grains having a size less than 0.1 μm on a substrate, which fine grains may be evaporated by being irradiated with electron beams, irradiating predetermined locations of the grain coated substrate by an electron beam modulated in response to information to be recorded by the method, by selectively evaporating fine grains at the predetermined locations irradiated by the electron beam, and irradiating the substrate on which information is recorded with the electron beam to detect the presence or absence of fine grains in order to reproduce the previously recorded information. According to the above described system, large recording densities may be obtained, such as approximately $10^{12}$ bits/cm$^2$.

11 Claims, 1 Drawing Sheet

METHOD FOR RECORDING AND REPRODUCING INFORMATION

BACKGROUND OF THE INVENTION

1. Field of the Invention

The present invention relates to a method for recording and reproducing information, and more particularly to a method for recording and reproducing information which is capable of recording information with high density.

2. Description of the Prior Art

Methods for recording and reproducing information heretofore known include a magnetic recording and reproducing method which uses a ferromagnetic medium such as a magnetic disc, a magnetic tape or the like, a laser-beam recording and reproducing method which makes use of a laser beam, or a semiconductor memory, etc.

However, the recording density of these prior arts is $10^8$ to $10^9$ bits/cm$^2$ at the best, and a recording and reproducing system capable of recording information with higher density than that just mentioned has been required.

SUMMARY OF THE INVENTION

It is an object of the present invention to provide a new recording and reproducing method capable of recording with higher density.

This invention provides a method which comprises regularly arranged fine grains on a substrate previously, the fine grains consisting of material that may be vaporized by an electron beam, irradiation from an electron beam is modulated according to information to be recorded on the thus regularly arranged fine grains to selectively vaporize the fine grains thereby recording information, and irradiating the electron beam on the substrate with information recorded thereon to detect the presence and absence of the fine grains, thereby reproducing the recorded information.

According to this method, the possible recording density is determined by the size of fine grains previously regularly arranged and the diameter of the electron beam. If the present electron optics technology is utilized, the recording density of $10^{12}$ bits/cm$^2$ or more may be obtained.

Embodiments of the present invention include a method for regularly arranging fine grains on a substrate, specific examples of materials forming fine grains, a method for reducing the irradiation of electron beams used for recording, a method for preventing the vaporization of fine grains by electron beam irradiation for reproduction, a method for detecting the presence or absence of fine grains, etc.

The method according to the present invention will be described in detail with reference to the drawings.

According to the present invention, first, fine grains of material capable of being vaporized by electron beam irradiation are regularly arranged on the substrate. As a method for preparing said fine grains, various lithography techniques used for producing integrated circuits may be employed. However, the following method using a phenomenon which has been recently discovered is preferable. (See Japanese Patent Application No. 163, 881/1984).

According to this method, a finely drawn electron beam is projected in a stripe-like pattern on a substrate having a very smooth surface while being scanned. Subsequently the electron beam is likewise projected in a stripe-like pattern on the same place in a scanning direction at right angles to that of the former. Thereafter, material forming fine grains having a mean thickness of 10 to 100 Å is deposited on the substrate by vacuum evaporation method. Then, the fine grains of the deposited material are regularly in accordance with the locus of the electron beam irradiation.

Alternatively, the order of preparation is reversed to that of the above-described method. That is, material forming fine grains having a film thickness of 10 to 100 Å is uniformly deposited on the substrate, and then the electron beam is scanned in a stripe-like pattern crossed with each other so that the material is vaporized in the unrequired area, thereby regularly arranging the fine grains longitudinally and laterally.

FIG. 1 shows a system of fine grains obtained according to the aforementioned method. When the finely drawn electron beam is scanned along the rows of fine grains aligned in a two-dimensional pattern and at the same time the electron beam is turned ON and OFF according to a digitally-converted signal (0 or 1), the electron beam impinged upon a fine grain corresponding to "0" signal (indicated at black circles in FIG. 1), and electron beam is not irradiated on a fine grain corresponding to "1" signal (indicated at while circles in FIG. 1). In the present invention, since the fine grains consist of material which is vaporized by electron beam irradiation, the fine grains are present or absent according to the digital signal, and thus the signal is recorded.

Material forming fine grains that may be used in the present invention can be of any material if they are vaporized by electron beam irradiation. These materials include halides, for example, such as LiF, LidCl, LiBr, LiI, NaF, NaCl, NaBr, NaI, KF, KCl, KBr, KI, RbF, RbCl, RabBr, RbI, CsF. CsCl, CsBr, CsI, CuCl, CuBr, CuI, AgF, AgCl, AgBr, AgI, AlF$_3$, and organic compounds, for example, such as palmitic acid, stearic acid, acrylic acid, methacrylic acid, methallophtacyanine, merocyanine, naphthalene, anthracen, pyrene, etc. Particularly, KI, RbI or CsI is preferred.

According to the method of the present invention, recording can be made at a room temperature in substrate temperature. However, the substrate temperature is preferably from 100° C. to 1000° C. at which the intensity of electron beam irradiation required to vaporize the fine grains is reduced so that quicker recording is possible.

On the other hand, the smaller the size of fine grains, the lower the intensity of electron beam irradiation required to vaporize one fine grain, and therefore quicker recording is possible. Particularly, the size of fine grains smaller than 0.1 μm is preferred.

In the present invention, signals recorded by the presence or absence of fine grains are reproduced by scanning electron beam irradiation in a manner similar to that of recording along the rows of recorded fine grains to detect the presence or absence of grains.

Means for detecting the presence or absence of grain include methods for detecting the quantity of secondary electrons, reflected electrons, specimen absorbing current, cathode luminescense, or etc. However, the method for detecting the number of secondary electrons is preferred which method can obtain the highest signal-to-noise ratio.

According to the present invention, since reproduction is also carried out by electron beam irradiation. If electron beam is irradiated under the same conditions as those of electron beam used for recording, fine grains are vaporized during reproducing to lose the recording, which is not preferable. To avoid this, the present invention is possible to provide the methods of:

(1) decreasing the strength of electron beams used when reproducing as compared with that when recording,
(2) increasing a substrate temperature when recording as compared with that when reproducing, and
(3) coating recorded fine grains with material which is not vaporized by the reproducing electron beam irradiation.

Among these methods, the methods (2) and (3) are preferable because signals are less attenuated. In the method (3), when a large amount of coating is used, the signal-to-noise ratio is low while when a small amount of coating is used, the signal is unavoidably attenuated when reproducing is repeated, and such is not preferable. After all the thickness of 5 to 50 Å is preferred. It is noted that these three methods may be combined for use.

Materials used for the coating in the method (3) above can be any material if the latter is not evaporated by electron beam irradiation and can easily form a thin film. These materials include, for example, metals such as Be, Mg, Ti, Zr, V. Nb, Ta, Cr, Mo, W, Ca, Mn, Fe, Co, Ni, Cu, Zn, etc.; semiconductors such as Si, Ge, etc.; oxided such as BeO, CaO, $Fe_2O_3$, MgO, NiO, $SiO_2$, ZnO, $ZrO_2$, $Al_2O_3$, $Cr_2O_3$, $TiO_2$, CoO, etc.; nitrides such as TiN, $Zr_3N_2$, AlN, CrN, $Si_3N_4$, ZrN, $Mg_3N_2$, FeN, BN, etc.; and organic compounds such as polyethylene, polyimide, polyacrylonitrile, polycarbonate, etc. The easiest method comprises introducing a recorded system of fine grains into the vacuum atmosphere evacuated by a diffusion pump and projecting an electron beam on the surface thereof. According to this method, it is possible to thinly coat hydrocarbon, which is induced by electron beam irradiation, on said system of fine grains. This can be considered that oil vapor from the diffusion pump is changed in properties by the electron beam and adsorbed.

The recording density obtained by the method of the present invention is determined according to the size of the fine grains and the diameter of the electron beam irradiated. The diameter of electron beam may be drawn to 20 Å or less even with present electro-optics, and the recording density is almost determined by the size of the fine grains. Since the size of fine grains on the substrate may be made to be as small as 100 Å or less, the recording density possibly used is above $10^{12}$ bits/$cm^2$.

EXAMPLE

The method of the present invention will be described in detail by way of a few examples. However, the scope of the present invention is not limited by these examples.

Example 1

An area of 20 $\mu m \times 20$ $\mu m$ on a silicon wafer was irradiated for three minutes by scanning in a stripe-like pattern at intervals of 200 Å with electron beam having a diameter of approximately 50 Å, an accelerating voltage of 30 KV and a current of 10 $\mu\mu A$. At this time, when the electron beam is transferred to another scanning line, the beam undergoes blanking to prevent irradiation.

Then, the same area was irradiated under the same condition as described above with the scanning direction set at right angles to that of the former.

Subsequently, potassium iodide was deposited in a weight thickness of 40 Å on the silicon wafer.

When the portion of the wafer on which electron beam was irradiated is observed by an electron microscope, fine grains of potassium iodide having a diameter of approximately 150 Å orderly arranged in a two-dimensional square lattice-like pattern at intervals of 200 Å were observed.

Figure 1:
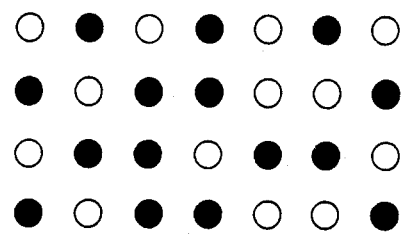
FIG. 1 is a plan view schematically showing the state of the surface of a substrate on which information is recorded according to the present invention.
Figure 2:
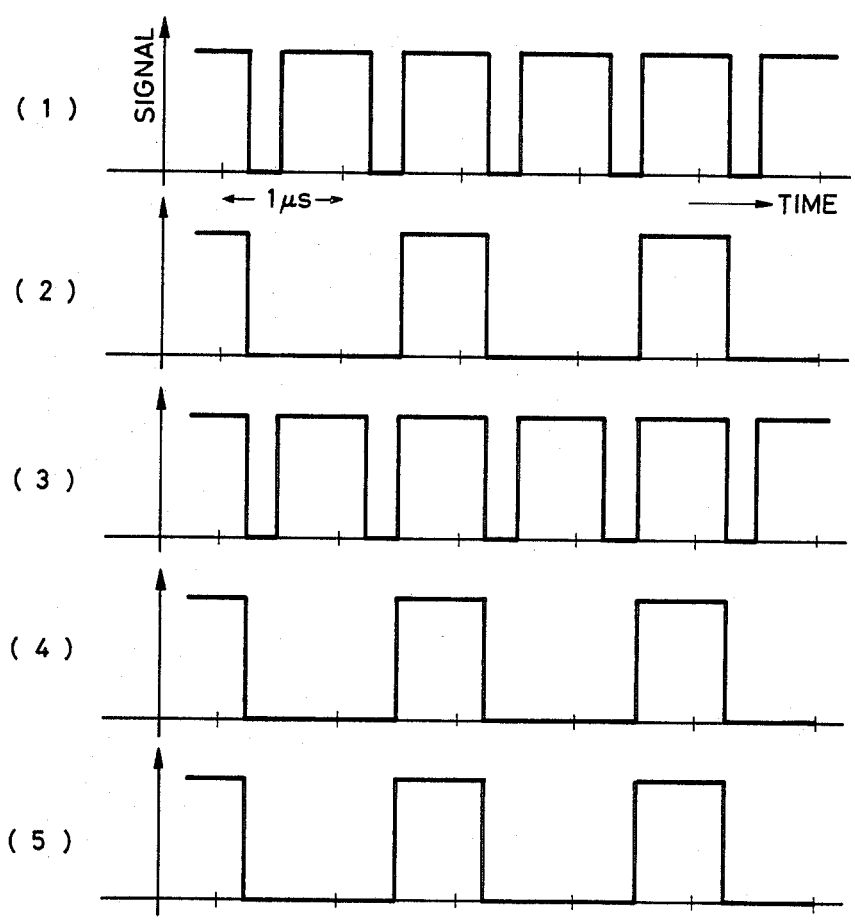
FIG. 2 shows waveforms of reproducing signals by secondary electrons detected from the substrate according to an embodiment of the invention.

Electron beams having a diameter of 40 Å, accelerating voltage of 10 KV and current of 1 $\mu\mu A$ were irradiated along the thus arrayed rows of fine grains while scanning at a speed of 2 cm/sec, and secondary electrons at that time was detected. When this signal is processed by a comparator, a signal as indicated in FIG. 2 (1) was obtained.

Next, electron beams having a diameter of 100 Å, accelerating voltage 40 KV and current 100 $\mu\mu A$ were irradiated on the thus arranged fine grains scanned along the rows thereof at a speed of 2 cm/sec. At that time, the electron beam was turned ON/OFF every other fine grain.

An electron beam having a diameter of 40 Å, an accelerating voltage 10 KV, a current of 1 $\mu\mu A$ were irradiated with scanning at a speed of 2 cm/sec along the rows of fine grains on the wafer after being subjected to the aforementioned step and the quantity of secondary electrons at that time was detected. When this signal is processed by a comparator, a signal as shown in FIG. 2 (2) was obtained. This shows that the recorded signal was reproduced without modification.

Embodiment 2

An area of 20 $\mu m \times 20$ $\mu m$ on a silicon wafer was irradiated for three minutes by scanning in a stripe-like pattern at intervals of 200 Å with electron beam having the diameter of approximately 50 Å, an accelerating voltage of 30 KV, and a current of 10 $\mu\mu A$. At this time, when the electron beam is transferred to another scanning line, the beam undergoes blanking to prevent irradiation.

Then, the same area was irradiated under the same condition as that described above with the scanning direction set at right angles to that of the former.

Subsequently, NaCl was deposited in a weight thickness of 40 Å by vacuum evaporation on the silicon wafer.

When the portion of the wafer on which electron beam was irradiated is observed by an electron microscope, fine grains of NaCl having a diameter of approx. 150 Å arranged in a two-dimensional square lattice-like pattern at an interval of 200 Å were observed.

An electron beam having a beam diameter of 40 Å, an accelerating voltage of 10 KV and a current of 1 $\mu\mu A$ were irradiated while scanning at a speed of 2 cm/sec along the thus arrayed rows of fine grains and the intensity of secondary electrons at that time was detected. When this signal is processed by a comparator, a signal as indicated in FIG. 2 (3) was obtained.

The wafer was heated and maintained at 300° C., and electron beams having a diameter of 50 Å, an accelerating voltage of 30 KV and a current of 10 μμA were irradiated while scanning at a speed of 2 cm/sec along the thus arrayed rows of fine grains. At that time, the electron beam was turned ON/OFF every other fine grain.

Next, the temperature of the wafer is returned to room temperature, and an electron beam having a diameter of 50 Å, an accelerating voltage of 30 KV and a current of 10 μμA were irradiated while scanning at a speed of 2 cm/sec along the rows of fine grains on the wafer and the intensity of secondary electrons at that time was detected. When this signal is processed by a comparator, a signal as indicated in FIG. 2 (4) was obtained. This shows that the recorded signal was reproduced without modification.

Embodiment 3

An area of 20 μm×20 μm on a silicon wafer was irradiated for three minutes by scanning in a stripe-like pattern at an interval of 200 Å with electron beams having a diameter of approximately 50 Å, an accelerating a voltage of 30 KV and a current 10 μμA. At this time, when the electron beam is transferred to another scanning line, the beam undergoes blanking to prevent irradiation.

Then, the same area was irradiated under the same condition as that described above with the scanning direction set at right angles to that of the former.

Subsequently, pyrene was deposited in a weight thickness of 30 Å on the silicon wafer.

When the portion of the wafer on which electron beam was irradiated is observed by an electron microscope, fine grains of pyrene having a diameter of approx. 150 Å arranged in a two-dimensional square lattice-like pattern at an interval of 200 Å were observed.

Electron beams having a diameter of 100 Å, an accelerating voltage of 40 KV and a current of 100 μμA were irradiated while scanning at a speed of 2 cm/sec along the rows of fine grains. At that time, an electron beam was turned ON/OFF every other fine grain.

Next, carbon of approximately 20 Å was vacuum deposited on the fine grain.

Electron beams having a diameter of 40 ÅA, an accelerating voltage of 10 KV and current of 1 μμA were irradiated while scanning at a speed of 2 cm/sec, along the rows of fine grains after being subjected to said step and the intensity of secondary electrons at that time was detected. When this signal is processed by a comparator, a signal as shown in FIG. 2 (5) was obtained. This shows that the recording signal was reproduced without modification.

According to the present invention, there is provided a new information recording and reproducing method on the basis of a principle which is fundamentally different from that of conventional various information recording and reproducing methods. The recording density is above $10^{12}$ bits/cm$^2$, which is far above $10^9$ bits/cm$^2$, the upper limit of the prior art. The device of the present invention is expected to be widely used in the future in the field of video information recording and reproducing apparatus, memories of electronic computers, etc. which would require higher density recording.

What is claimed is:

1. A method for recording and reproducing information comprising the steps of:
    regularly arranging fine grains having a size less than 0.1 μm on a substrate, which fine grains may be evaporated by being irradiated with electron beams,
    irradiating predetermined locations of said grain coated substrate by an electron beam modulated in response to information to be recorded by said method, by selectively evaporating fine grains at said predetermined locations irradiated by said electron beam; and
    irradiating said substrate on which information is recorded with said electron beam to detect the presence or absence of fine grains in order to reproduce the previously recorded information.

2. The method for recording and reproducing information according to claim 1, wherein the material that may be evaporated by irradiation of electron beam is selected from Lif, LiCl, LiBr, LiI, NaF, NaCl, NaBr, NaI, KF, KCl, KBr, KI, RbF, RbCl, RbBr. RbI, CsF, CsCl, CsBr, CsI, CuCl, CuBr, CuI, AgF, AgCl, AgBr, AgI, AlF$_3$, palmitic acid, stearic acid, crylic acid, methacrylic acid, methallophtacyanine, merocyanine, naphthalene, anthracen, and pyrene.

3. The method for recording and reproducing information according to claim 1, wherein in order to regularly arrange the fine grains on the substrate, the electron beam is scanned in a stripe-like pattern across the substrate in two different directions and then the material that may be evaporated by electron beam irradiation is deposited thereon.

4. The method for recording and reproducing information according to claim 1, wherein the material that may be evaporated by electron beam irradiation is first deposited on the substrate and then the electron beam is scanned in a stripe-like pattern across the substrate in two different directions on the deposited film, thereby regularly arranging the fine grains on the substrate.

5. The method for recording and reproducing information according to claim 1, wherein a temperature of the substrate when recording is 100° C. or above.

6. The method for recording and reproducing information according to claim 1, wherein a temperature of the substrate when reproducing is lower than a temperature of the substrate when recording.

7. The method for recording and reproducing information according to claim 1, wherein the intensity of electron beam used for reproducing is decreased as compared with that of electron beam used for recording.

8. The method for recording and reproducing information according to claim 1, wherein the fine grains on the substrate which has already been recorded are coated with a material which is not evaporated by electron beam irradiation of used for reproducing.

9. The method for recording and reproducing information according to claim 8, wherein the coating material is selected from metals such as Be, Mg, Ti, Zr, V, Nb, Ta, Cr, Mo, W, Ca, Mn, Fe, Co, Ni, Cu, Zn,; semiconductors such as Si, Ge,; oxides such as BeO, CaO, Fe$_2$O$_3$, MgO, NiO, SiO$_2$, ZnO, ZrO$_2$, Al$_2$O$_3$, Cr$_2$O$_3$, TiO$_2$, coO; nitrides such as TiN, Zr$_3$N$_2$, AlN, CrN, Si$_3$N$_4$, ZrN, Mg$_3$N$_2$, Fen, BN,; and organic compounds such as polyethylene, polyimide, polyacrylonitrile, polycarbonate.

10. The method for recording and reproducing information according to claim 8, wherein the coating is performed by electron beam irradiation in a vacuum atmosphere evacuated by a diffusion pump.

11. The method for recording and reproducing information according to claim 1, wherein the fine grains are detected by either detection of a quantity of secondary electrons, reflected electrons, cathode luminescense, or specimen absorbing current when the electron beam is irradiated.

* * * * *